US008483120B2

(12) United States Patent
Seligsohn et al.

(10) Patent No.: US 8,483,120 B2
(45) Date of Patent: *Jul. 9, 2013

(54) HIGH EFFICIENCY SUB-ORBITAL HIGH ALTITUDE TELECOMMUNICATIONS SYSTEM

(76) Inventors: Sherwin I. Seligsohn, Narberth, PA (US); Scott Seligsohn, Bala Cynwyd, PA (US)

(*) Notice: Subject to any disclaimer, the term of this patent is extended or adjusted under 35 U.S.C. 154(b) by 1604 days.

This patent is subject to a terminal disclaimer.

(21) Appl. No.: 10/307,116

(22) Filed: Nov. 26, 2002

(65) Prior Publication Data

US 2004/0008637 A1     Jan. 15, 2004

Related U.S. Application Data

(63) Continuation of application No. 10/214,948, filed on Aug. 8, 2002, now abandoned, which is a continuation of application No. 09/097,103, filed on Jun. 12, 1998, now abandoned, which is a continuation of application No. 08/488,213, filed on Jun. 7, 1995, now abandoned, which is a continuation-in-part of application No. 08/100,037, filed on Jul. 30, 1993, now abandoned, application No. 10/307,116, which is a continuation-in-part of application No. 10/180,217, filed on Jun. 25, 2002, which is a continuation of application No. 09/157,701, filed on Sep. 21, 1998, now abandoned, which is a continuation of application No. 08/591,532, filed as application No. PCT/US94/08059 on Jul. 22, 1994, now abandoned, which is a continuation-in-part of application No. 08/100,037, filed on Jul. 30, 1993, now abandoned.

(51) Int. Cl.
*H04B 7/185*     (2006.01)

(52) U.S. Cl.
USPC ............................ 370/316; 370/400; 455/11.1

(58) Field of Classification Search
USPC ................ 455/431, 12.1, 13.1; 370/310, 315, 370/328
See application file for complete search history.

(56) References Cited

U.S. PATENT DOCUMENTS

| 2,626,348 | A |   | 1/1953  | Nobles                  |
| 3,614,031 | A |   | 10/1971 | Demboski                |
| 3,643,259 | A | * | 2/1972  | Entner ......... 342/357.01 |
| 3,663,762 | A |   | 5/1972  | Joel, Jr. ......... 455/440 |

(Continued)

FOREIGN PATENT DOCUMENTS

| GB | 2 082 995 | * | 3/1982 |
| JP | 51 6609   |   | 1/1976 |

(Continued)

OTHER PUBLICATIONS

Winters, Jack H., "Signal Acquisition and Tracking with Adaptive Arrays in Wireless Systems," *IEEE*, pp. 85-88 (May 18, 1993).

(Continued)

*Primary Examiner* — Kevin C Harper (57) ABSTRACT

A wireless telecommunications system comprising a plurality of telecommunications nodes that include receivers and transmitters that are located in a suborbital plane. The telecommunications signals are broadband digital radio signals which are modulated by code division multiple access spread spectrum technology. The receivers include a plurality of antennae that are operative to receive relatively weak telecommunications signals and which use spatial processing to identify their source so that maximum utilization of the spectrum is made available for use by the telecommunications signals without interference.

131 Claims, 2 Drawing Sheets

U.S. PATENT DOCUMENTS

| | | | |
|---|---|---|---|
| 3,742,358 A | 6/1973 | Cesaro | |
| 3,906,166 A | 9/1975 | Cooper et al. | 455/437 |
| 3,971,454 A * | 7/1976 | Waterbury | 180/65.8 |
| 4,860,352 A * | 8/1989 | Laurance et al. | 380/258 |
| 4,901,307 A * | 2/1990 | Gilhousen et al. | 370/320 |
| 4,995,572 A * | 2/1991 | Piasecki | 244/2 |
| 5,206,882 A | 4/1993 | Schloemer | |
| 5,327,572 A * | 7/1994 | Freeburg | 455/430 |
| 5,343,512 A * | 8/1994 | Wang et al. | 455/410 |
| 5,386,953 A * | 2/1995 | Stuart | 244/158 R |
| 5,448,623 A | 9/1995 | Wiedeman et al. | 455/431 |
| 5,479,397 A | 12/1995 | Lee | |
| 5,519,761 A | 5/1996 | Gilhousen | 455/430 |
| 5,559,865 A | 9/1996 | Gilhousen | 455/431 |
| 6,167,263 A * | 12/2000 | Campbell | 455/431 |

FOREIGN PATENT DOCUMENTS

| | | |
|---|---|---|
| JP | 53 148907 | 12/1978 |
| JP | 1 180129 | 7/1988 |
| JP | 3 104426 | 5/1991 |
| JP | 4 286975 | 10/1992 |
| JP | 4 355522 | 12/1992 |
| JP | 4 96528 | 11/1996 |

OTHER PUBLICATIONS

George Gilder, *From Wires to Waves*, Forbes ASAP, Jun. 5, 1995, pp. 125-141.

Mark Dzlatklewics, *Smart Antennas Transmit Savings*. Jan. 15, 1995, pp. 83-84.

Found on the Internet: http://mathworld.com/StandardDeviation.html, *Probability and Statistics*, May 28, 2003, pp. 1-12.

Found on the Internet: http://www.spirentcom.com/documents/159.pdf, *Emulating RF Channel Characteristics*, May 27, 2003, pp. 1-10.

Found on the Internet: http://www.tpub.com/neets/book11/46c.htm, *Antenna Arrays*, May 27, 2003, pp. 1-7 and 1-2.

Found on the Internet: http://www.ee.surrey.ac.uk/Personal/D.Jefferies/pantarray.html, *Antenna Arrays*, May 27, 2003, pp. 1-12.

Brown et al., *Balloon Technology Offers High-Altitude Applications*, Aviation Week & Space Technology, Nov. 16, 1992, pp. 56-7 (translation provided).

Found on the Internet: http://www.electronicstimes.com/story/OEG20030408S0042, *Intel Helps Found WiMAX Broadband Wireless Forum*, Semiconductor Business News, Apr. 8, 2003.

Dr. Philip C. Koenig, Communications, Surveillance, and Cargo: *Some Current Directions and Programs in Airship Design and Development*, Office of Naval Research Int'l Field Office, Aug. 21, 2001, pp. 1-2.

*Airships to Complement Satellite and Terrestrial Systems*, ESA Press Release, Mar. 10, 2003. pp. 1-2.

Mark Long, *Wi-Fi Heads for the Stratosphere*, Nov. 25, 2002.

Found on the Internet: http://skvstation.com/presentation/Regulatory/sld003.htm, *Initial ITU Activities*, Regulatory Affairs [International], Mar. 7, 2003.

Found on the Internet: http://www.wired.com.news.wireless 0.1382,56961,00.html, *Bird? Plane? UFO? No, Stratellite*, 2003 Associated Press, pp. 1-3.

Found on the Internet: http://msnbc.com/news/891861, *DOD Turns to Commercial Satelllites*, Technology & Science, Mar. 27, 2003.

Naguib et al., *Capacity Improvement of Base-Station Antenna Arrays Cellular CDMA*, 1993 IEEE, pp. 1437-1441.

Dr. Joseph Pelton, *Space Segment Technologies for the 21$^{st}$ Century: Key Challenges for National Satellite Systems*, 1991 IEEE, pp. 1103-1107.

Wu et al., *A Broadband Wireless Access System Using Stratospheric Platforms*, 2000 IEEE Global Telecomunications Conference, pp. 225-230.

http://www.geo-orbit.org/sizepgs/geodef.html, "Geostationary, LEO, MEO, HEO Orbits Including Polar and Sun-Synchronous Orbits with Example Systems and a Brief Section on Satellite History", May 27, 2008.

Kary, Tiffany, "Motorola Settles Iridium Unit's Creditor Claims (Update 5)", Bloomberg.com, Apr. 23, 2008.

Hesseldahl, Arik, "The Return of Iridium", Forbes.com, Nov. 30, 2001.

Hua, Vanessa, "Globalstar Hangs on in Satellite Wireless", p. C-9 of the San Francisco Chronicle, Mar. 9, 2001.

http://en.wikipedia.org/wiki/Globalstar, Globalstar, May 27, 2008.

* cited by examiner

HIGH EFFICIENCY SUB-ORBITAL HIGH ALTITUDE TELECOMMUNICATIONS SYSTEM

RELATED PATENT APPLICATIONS

This application is a continuation of U.S. patent application Ser. No. 10/214,948, filed on Aug. 8, 2002, now abandoned which is a continuation of Ser. No. 09/097,103, filed Jun. 12, 1998, now abandoned, which is a continuation of U.S. patent application Ser. No. 08/488,213, filed Jun. 7, 1995, now abandoned, which is a continuation-in-part of U.S. patent application Ser. No. 08/100,037, filed Jul. 30, 1993, now abandoned. This application is also a continuation-in-part of U.S. patent application Ser. No. 10/180,217, filed Jun. 25, 2002, which is a continuation of U.S. patent application Ser. No. 09/157,701, filed Sep. 21, 1998, now abandoned, which is a continuation of U.S. patent application Ser. No. 08/591,532, filed Aug. 26, 1996, now abandoned, which claims the benefit as a national stage application of PCT/US94/08059, filed Jul. 22, 1994, which is a continuation-in-part of U.S. patent application Ser. No. 08/100,037, filed Jul. 30, 1993, now abandoned. All of the applications listed above are incorporated by reference herein.

FIELD OF THE INVENTION

This invention relates to a telecommunications system, and more particularly to a telecommunications system that is operative at the sub-orbital level and provides for increased efficiency and increased utilization of available telecommunications channels.

BACKGROUND OF THE INVENTION

The growth of cellular telecommunications has placed enormous strains on the ability of the industry to satisfactorily handle the telecommunications traffic that has been generated. Consequently, users of present analog cellular telecommunications systems find that they may have to wait for a telecommunications channel to become available before they can place or receive a call. Also, a call in progress may encounter interference in the form of noise or actually overhearing another conversation.

Sometimes, a call may be cut off while in progress if one of the parties moves to a cell that does not have an available telecommunications channel.

The problem is further aggravated by the fact that there are only a limited number of frequencies allocated for cellular telecommunications. Thus, the problem is expected to grow as the demand for cellular telecommunications expands.

The industry has developed several improved analog and digital technologies that have been successfully used to increase the number of communications channels within the limited number of available frequencies.

The most important of these technologies are time division multiple access (TDMA) and code division multiple access (CDMA).

TDMA is the technology that has the widest use. It enables a single telecommunications channel to be used for several calls. Each call is allocated a particular discrete time interval in the cycle of the telecommunications signals, thus, improving efficiency.

CDMA uses a wide band of spectrum for telecommunications signals to achieve efficiency. It differentiates between calls by imprinting a distinctive "noise" spreading signal over each telecommunications signal to differentiate it from other telecommunications signals in the cell. The receiver with computer assistance decodes the assigned "noise" signal to identify the call and then despreads the telecommunications signal.

"Frequency hopping" is a form of CDMA @hat spreads a call over a series of frequencies. It uses a code to identify the sequence of frequencies that are being used.

Additionally, work has been done with respect to developing systems which can identify weak signals emanating from a cell and segregating those signals from other signals emanating from the same cell so that when combined with a digital multiple access technique such as CDMA, the number of available telecommunications channels is dramatically increased.

Attempts to increase the availability of telecommunications channels have also included attempts to make the cells smaller and to reduce the power requirements necessary for communicating with a base station. This follows from the fact that a weak signal has a reduced ability to propagate. Thus, since its strength rapidly dissipates, the same frequency can be used in a nearby non-contiguous cell.

However, to provide the requisite number of cells that would be necessary to support a high volume of telecommunications, there would have to be an enormous number of base stations. Some experts estimate that at least 100,000 cells would be necessary simply to cover major metropolitan areas in the United States. Each cell would require its own stationary antenna tower.

In addition, an enormously complex computer system would be required in order to deal with the hand-offs which would be necessary as the cellular telephones moved from cell to cell and to manage the reuse of the frequencies assigned to particular calls.

It is not certain that the problem can be solved with a ground based system at a reasonable cost and in a reasonable period. Thus, while the typical limitations associated with such systems such as line of sight, shadowing due to signal reflection, attenuation and horizon limitations, are eliminated by reducing the size and increasing the number of cells, geographic, political, environmental and social factors may prohibit the placing of antenna towers in certain locations thereby making it not possible for cells of a suitable size to be achieved in those locations.

A satellite system where each of the satellites functions as a base station node and contributes to the creation of a cellular network avoids these problems. However, in such a system relatively powerful transmitters are required because the satellites typically orbit at about 22,500 miles above the earth. Further, unless they are geosynchronous, a means must be provided for handing off signals from one satellite to another as they pass a given point over the earth. Further, as with terrestrial nodes, a hand off means is needed as a caller moves between cells.

Additionally, satellite systems suffer from the enormous cost in connection with launching, and the virtual impossibility of repair.

Accordingly, with the foregoing in mind, the present invention relates to a wireless telecommunications network system comprising a plurality of telecommunications nodes that are located in a suborbital plane. Each of the nodes comprises means for sending and receiving broadband digital radio telecommunications signals over a wireless telecommunications channel. The telecommunications signals are modulated by code division multiple access spread spectrum technology.

The means for sending and receiving wireless, digital telecommunications signals include a plurality of antennae that are operative to receive relatively weak telecommunications signals from a source. Means are provided for decoding the telecommunications signals received by each of said antennae so that the node can identify the source, and the antenna and decoding means are operative to increase the sensitivity of the node so that it can detect and receive relatively weak telecommunications signals, so that maximum utilization of the spectrum is made available for use by the telecommunications signals without interference.

An exemplary embodiment of the invention includes a cellular-type wireless communications system including: (i) a wireless switching center connected to a telephone network; (ii) a plurality of airborne base stations each associated with a cell corresponding to a specific geographic area, each of said plurality of airborne base stations operable to directly transmit and receive communication signals to/from individual subscriber terminals within the associated cell and to/from said wireless switching center to enable communication sessions to be maintained, through the telephone network, between individual subscriber terminals and other telecommunication terminals; and (iii) at least one of said plurality of airborne base stations having at least one antenna for communicating with said wireless switching center and with individual subscriber terminals in a specific geographic region, said plurality of airborne base stations comprising at least a first airborne base station supported by a first aircraft above the geographic region and a second airborne base station supported by a second aircraft. The first airborne base station may be operative to hand off communication sessions with subscriber terminals to the second airborne base station, for example, in a manner consistent with a CDMA technology associated handoff, with the wireless switching center coordinating handoffs between the first and second airborne base stations.

An exemplary embodiment of the present invention may also include an energy storage system and a solar panel. The energy storage system and said solar panel may be operable to power the propulsion system, e.g., at night.

An exemplary embodiment of the present invention may also include a means for detecting drift of said nodes and/or airborne base stations and/or relay stations in the sub-orbital plane. Drifting of relay stations from their pre-determined locations will be detected by the tracking stations. The tracking stations will then energize thrust members on the relay stations to return them to their pre-determined locations.

An exemplary method for wireless communications in a geographic area according to the present invention includes: (i) positioning a mobile switching center at a location to facilitate communication in the geographic area, said mobile switching center switching calls between ones of a plurality of airborne base stations and a telephone network; (ii) positioning and maintaining a plurality of airborne platforms above the geographic area; (iii) supporting said plurality of airborne base stations having at least one antenna on said respective plurality of airborne platforms for directly transmitting/receiving communication signals with a plurality of individual mobile subscriber terminals on the ground in said geographic area and with said mobile switching center, to enable communication sessions to be maintained, through the telephone network, between individual subscriber terminals and other telecommunication terminals; and (iv) handing off communication sessions of subscriber terminals from one of said plurality of airborne base stations to at least one other of said plurality of airborne base stations.

In an exemplary embodiment, the platform may be positioned at a location to minimize interference with transient airplanes.

DESCRIPTION OF THE DRAWINGS

The invention can be further understood by referring to the accompanying drawing of a presently preferred form thereof, and wherein.

DESCRIPTION OF A PREFERRED EMBODIMENT

Figure 1:
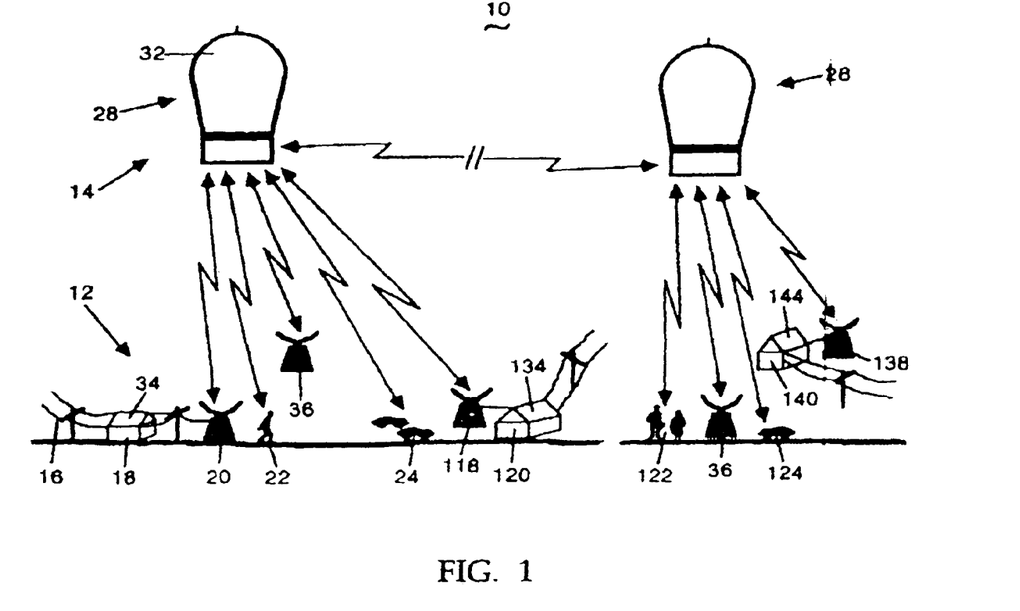
FIG. 1 is a schematic drawing showing a telecommunications system constructed in accordance with a presently preferred form of the invention.

Referring now to FIG. 1, a system 10 such as that described in patent application Ser. No. 08/100,037 comprises a ground based portion 12 and an air based portion 14. The air based portion 14 may be located at an altitude of between about 12 to 35 miles above the earth.

The ground based portion 12 may comprise conventional telephone network 16 with branches that are connected to ground stations 18, 120 and 140 having suitable long distance transmitting and receiving means such as antenna 20, 118 and 138. The ground based portion 12 may also comprise mobile telephones of well known types such as cellular telephones that may be carried by individuals 22 or in vehicles 24. The antennae 20, 118 and 138 are operative to transmit and receive telecommunications signals to and from a suborbital, high altitude relay station 28 which is located at an altitude of about 12 to 35 miles above the earth. This altitude is selected because it is well above weather activity so that the relay station will not be subjected to the strains that the weather might cause.

Preferably, there are a plurality of relay stations 28; each comprising a balloon 32 that is retained aloft and on station over a particular place over the earth by using a guidance module 56 which is connected by a guidance antenna 58 to ground link antennae 36 as described in patent application Ser. No. 08/100,037, filed Jul. 30, 1993.

As is well known, each relay station 28 contains means for receiving a telephone telecommunications signal from one of the ground stations 20, 120 and 140 individuals 22 and 122 or vehicles 24 and 124 and then transmitting it to another ground station 120 and 140, individual 122 or vehicle 124 either directly or by way of another relay station. The communications channel so established could be simplex, duplex or half duplex. Once the signal returns to the ground based portion 12 of the system 10, the telecommunications call is completed in a conventional manner as by being connected to the ground-based, wired telephone system through suitable switches 34, 134 and 144. The switches may be of any type suitable for telecommunications signals including digital and analog.

As is well known, each of the relay stations 28 defines a node in the telecommunications system with each node defining a "cell." Preferably, each of the nodes comprises means for sending and receiving broadband, digital radio telecommunications signals over a wireless telecommunications channel. Preferably, the telecommunications channel has a frequency band width that is greater than about 8 MHz. The telecommunications signals are preferably modulated by code division multiple access spread spectrum technology.

To maximize the utilization of the available frequencies beyond that which is currently available with CDMA, the cells should be relatively small and the signal power required for telecommunications signals very low. This will enhance the reusability of frequencies and reduce interference. However, reduced signal strength makes it more difficult for the base stations to track the movement of particular cellular phones.

Figure 2:
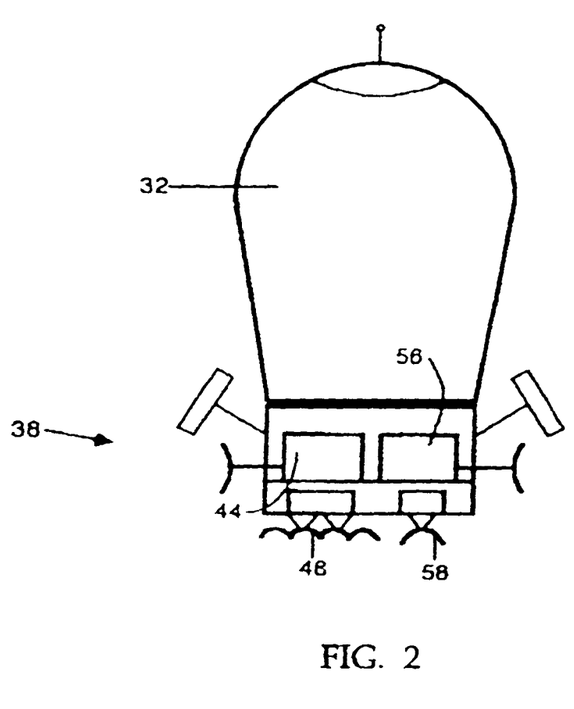
FIG. 2 is a schematic drawing showing an aspect of the detecting and decoding means.

A detection system comprising a suitable array of antennae 48 and decoders 44 on each of the relay stations is provided. The detection system is of a type similar to the spatial processing system that is described in FORBES ASAP; Jun. 5, 1995, at pages 125-141. The system processes the signal received by each of the antennas in the array. The decoded signals identify the transmitter and its location in the cell. Thus, even though a very weak signal, which ordinarily might be lost, is received by the detection system it can still be recognized and processed to complete a telecommunications channel.

The advantages of the combination of spread spectrum CDMA and the detection system comprising the antenna array described above are enhanced when combined and placed in the sub-orbital plane since all of the disadvantages of both terrestrial and satellite systems are avoided while their advantages, such as vertical signal propagation are maintained thereby increasing the utilization of the telecommunications spectrum. Further, power requirements can be lowered and the weight of the transmitters at the nodes can be reduced correspondingly. In addition because of the modulation technique the number of transmitters can be reduced.

Thus, a large number of telecommunications channels can be established in a cell defined by a particular node without the attendant problems of interference arising from crosstalk, reflection, frequency reuse and the like.

Additionally, the relatively high power requirements that such a system would require if it were associated with a satellite based telecommunications system are avoided.

It is contemplated that the system which has been described will be using code division multiple access spread spectrum technology; encompassing direct sequence and/or frequency hopping techniques.

Still further, while the frequency allocations for the telecommunications system have not been identified with particularity, it should be understood that they could be the same as those allocated for terrestrial telecommunications, or those allocated for satellite telecommunications. Similarly, it is within the scope of the invention for the frequencies to be those which are exclusively for use by the telecommunications system.

While the invention has been described with respect to certain forms and embodiments, it is apparent that other forms will be obvious to those skilled in the art in light of the foregoing description. Thus, the scope of the invention should not be limited by the description, but rather, only by the scope of the claims appended.

What is claimed is:

1. A wireless, telecommunications network system comprising:
    a plurality of telecommunications nodes,
    said nodes being located in a sub-orbital plane at about 12 to 35 miles above the earth,
    means for maintaining said nodes in preselected geographic locations in the sub-orbital plane,
    each of said nodes comprising means for sending and receiving broadband, digital radio telecommunications signals over a wireless telecommunications channel between said node in the sub-orbital plane and a mobile ground communication device, said radio telecommunications signals being modulated by broadband code division multiple access spread spectrum technology,
    said means for sending and receiving said radio telecommunications signals further including a plurality of antennae that are operative to receive relatively weak telecommunications signals from said mobile ground communication device,
    means for decoding the telecommunications signals received by each of said antennae so that said node can identify said mobile ground communication device and its location, and
    said antennae and said decoding means being operative to increase the sensitivity of said node to signals identifying said mobile ground communication device and its location so that it can detect and receive relatively weak telecommunications signals, so that maximum utilization of a spectrum is made available for use by said telecommunications signals without interference.

2. A system as defined in claim 1 wherein said code division multiple access spread spectrum technology is direct sequence.

3. A system as defined in claim 1 wherein said broadcast telecommunications channel has a frequency band width that is greater than about eight MHz.

4. A wireless, telecommunications network system comprising: a plurality of telecommunications nodes,
    said nodes being located in a sub-orbital plane at about 12 to 35 miles above the earth,
    means for maintaining said nodes in preselected geographic locations in the sub-orbital plane,
    each of said nodes comprising means for sending and receiving broadband, digital radio telecommunications signals over a wireless telecommunications channel between said node in the sub-orbital plane and a mobile ground communication device, said radio telecommunications signals being modulated by broadband code division multiple access spread spectrum technology,
    said means for sending and receiving said radio telecommunications signals further including a plurality of antennae that are operative to receive relatively weak telecommunications signals from said mobile ground communication device,
    means for decoding the telecommunications signals received by each of said antennae so that said node can identify said mobile ground communication device and its location,
    said antennae and said decoding means being operative to increase the sensitivity of said node to signals identifying said mobile ground communication device and its location so that it can detect and receive relatively weak telecommunications signals, so that maximum utilization of a spectrum is made available for use by said telecommunications signals without interference, wherein said wireless telecommunications channel has a frequency bandwidth that is greater than about eight MHZ.

5. A system as defined in claim 1 wherein each of said nodes is maintained stationary over its own point on the earth.

6. A system as defined in claim 1 wherein said means for sending and receiving broadband, digital radio telecommunications signals over a wireless telecommunications channel comprises at least one transmitter and receiver, and said transmitter and receiver carry a plurality of duplex telecommunications channels.

7. A system as defined in claim 6 wherein said transmitter is low powered and light weight.

8. A system as defined in claim 1 including a terrestrial based telecommunications network, and means for connecting said wireless, telecommunications network system to said terrestrial based telecommunications network.

9. A system as defined in claim 8 wherein said means for connecting said wireless, telecommunications network system to said terrestrial based telecommunications network includes switches.

10. A system as defined in claim 9 wherein said switches are digital.

11. A system as defined in claim 9 wherein said switches are analog.

12. A system as defined in claim 1 wherein said nodes are supported by balloons.

13. A system as defined in claim 1 wherein said wireless telecommunication channels are the same as those allocated for terrestrial communications.

14. A system as defined in claim 1 wherein said means for sending and receiving broadband, digital radio telecommunications signals over a wireless telecommunications channel comprises at least one transmitter and receiver and said transmitter and receiver carry a plurality of simplex telecommunications channels.

15. A system as defined in claim 14 wherein said transmitter is low powered and light weight.

16. A system as defined in claim 1 wherein said means for sending and receiving broadband, digital radio telecommunications signals over a wireless telecommunications channel comprises at least one transmitter and receiver, and said transmitter and receiver carry a plurality of half duplex telecommunications channels.

17. A system as defined in claim 16 wherein said transmitter is low powered and light weight.

18. A system as defined in claim 1 wherein said wireless telecommunication channels are the same as those allocated for orbital telecommunications.

19. A system as defined in claim 1 wherein said wireless telecommunication channels are exclusively used by said telecommunications system.

20. A method for making wireless telecommunications comprising the steps of:
providing a plurality of telecommunications nodes, said nodes defining a network,
locating said nodes in a sub-orbital plane at about 12 to 35 miles above the earth and maintaining said nodes in preselected geographic locations in the suborbital plane,
providing each of said nodes with means for sending and receiving broadband, digital radio telecommunications signals over a wireless telecommunications channel between said node in the suborbital plane and a mobile ground communication device,
providing each of said nodes with a plurality of antennae that are operative to receive relatively weak digital, radio telecommunications signals from said mobile ground communication device,
modulating said telecommunications signals by broadband code division multiple access spread spectrum technology,
decoding said telecommunications signals received by each of said antennae so that said node can identify said mobile ground communication device and its location, and said antennae and said decoding means being operative to increase the sensitivity of said nodes to signals identifying said mobile ground communication device and its location so that they can detect and receive said relatively weak telecommunications signals, so that maximum utilization of a spectrum is made available for use by said telecommunications signals without interference.

21. A method as defined in claim 20 wherein said code division multiple access spread spectrum technology is modified by direct sequence.

22. A method as defined in claim 20 wherein said code division multiple access spread spectrum technology is modified by frequency hopping.

23. A method for making wireless telecommunications comprising the steps of:
providing a plurality of telecommunications nodes, said nodes defining a network,
locating said nodes in a sub-orbital plane at about 12 to 35 miles above the earth and maintaining said nodes in preselected geographic locations in the suborbital plane,
providing each of said nodes with means for sending and receiving broadband, digital radio telecommunications signals over a wireless telecommunications channel between said node in the suborbital plane and a mobile ground communication device,
providing each of said nodes with a plurality of antennae that are operative to receive relatively weak digital, radio telecommunications signals from said mobile ground communication device,
modulating said telecommunications signals by broadband code division multiple access spread spectrum technology,
decoding said telecommunications signals received by each of said antennae so that said node can identify said mobile ground communication device and its location, said antennae and said decoding means being operative to increase the sensitivity of said nodes to signals identifying said mobile ground communication device and its location so that they can detect and receive said relatively weak telecommunications signals, so that maximum utilization of a spectrum is made available for use by said telecommunications signals without interference, wherein said wireless telecommunications channel has a frequency bandwidth that is greater than about eight MHZ.

24. A method as defined in claim 20 wherein each of said nodes is maintained over its own point on the earth.

25. A method as defined in claim 20 wherein said step of sending and receiving broadband, digital radio telecommunications signals over a wireless telecommunications channel comprises the step of providing a plurality of transmitters and receivers, and each of said transmitters carrying a plurality of duplex telecommunications channels.

26. A method as defined in claim 25 wherein said transmitters are low powered and light weight.

27. A method as defined in claim 20 including the steps of providing a terrestrial based telecommunications network, and connecting said wireless, telecommunications network system to said terrestrial based telecommunications network.

28. A method as defined in claim 27 including the step of providing switches for connecting said wireless, telecommunications network system to said terrestrial based telecommunications network.

29. A method as defined in claim 28 wherein said switches are digital.

30. A method as defined in claim 28 wherein said switches are analog.

31. A method as defined in claim 20 including the step of supporting said nodes by balloons.

32. A method as defined in claim 20 wherein said wireless telecommunication channels are the same as those allocated for terrestrial telecommunications.

33. A method as defined in claim 20 wherein said step of sending and receiving broadband, digital radio telecommunications signals over a wireless telecommunications channel comprises the step of providing at least one transmitter and one receiver, and said transmitter and receiver carry a plurality of simplex telecommunications channels.

34. A method as defined in claim 33 wherein said transmitter is low powered and light weight.

35. A method as defined in claim 20 wherein said step of sending and receiving broadband, digital telecommunications signals over a wireless telecommunications channel comprises the step of providing at least one transmitter and one receiver, and said transmitter and receiver carry a plurality of half duplex telecommunications channels.

36. A method as defined in claim 35 wherein said transmitter is low powered and light weight.

37. A method as defined in claim 20 wherein said wireless telecommunication channels are the same as those allocated for orbital telecommunications.

38. A method as defined in claim 20 wherein said wireless telecommunication channels are exclusively used by said telecommunications system.

39. A cellular-type wireless communications system comprising:
a wireless switching center connected to a telephone network;
a plurality of airborne base stations each associated with a cell corresponding to a specific geographic area, each airborne base station operable to directly transmit and receive communication signals to/from individual subscriber terminals within the associated cell and to/from said wireless switching center to enable communication sessions to be maintained, through the telephone network, between individual subscriber terminals and other telecommunication terminals, said plurality of airborne base stations including at least one antenna for communicating with said wireless switching center and with individual subscriber terminals in an associated cell; and
each of said plurality of airborne base stations being supported by at least one airborne platform including a propulsion system, the propulsion system being mounted on the airborne platform and being operable to maintain the platform airborne above a geographic area being serviced by the airborne base station; and
each of said plurality of airborne base stations being operative, in conjunction with the wireless switching center, to hand off communication sessions with subscriber terminals to at least one other airborne base station.

40. A wireless communications system according to claim 39 wherein the platform includes a high altitude balloon.

41. A wireless communications system according to claim 39 wherein the propulsion system includes a propeller driven by an electric motor.

42. A wireless communication system according to claim 41 further including an energy storage system and a solar panel, said energy storage system and said solar panel being operable to power said propulsion system.

43. A wireless communications system according to claim 42 wherein said solar panel is operable to recharge said energy storage system.

44. A wireless communications system according to claim 42 wherein said energy storage system is operable to power said propulsion system during nighttime operation and said solar panel is operable to power said propulsion system during daytime operation.

45. A wireless communications system according to claim 39 wherein said propulsion system maintains said platform at an altitude of about 15 to about 20 miles above sea level.

46. A wireless communications system according to claim 45 wherein the platform is maintained at an altitude of about 15 miles above sea level.

47. A wireless communications system according to claim 39 wherein said at least one antenna comprises a high gain, narrow beam antenna array.

48. A wireless communications system according to claim 39 wherein the platform includes an aircraft.

49. A wireless communication system according to claim 39, wherein the at least one airborne base station includes first and second airborne base stations, said first airborne base station communicating with said second airborne base station via a microwave link.

50. A method for wireless communications in a geographic area comprising:
positioning a mobile switching center at a location to facilitate communication in the geographic area, said mobile switching center switching calls between ones of a plurality of airborne base stations and a telephone network;
positioning and maintaining a plurality of airborne platforms above the geographic area;
supporting said plurality of airborne base stations having at least one antenna on said respective plurality of airborne platforms for directly transmitting/receiving communication signals with a plurality of individual mobile subscriber terminals on the ground in said geographic area and with said mobile switching center, to enable communication sessions to be maintained, through the telephone network, between individual subscriber terminals and other telecommunication terminals; and
handing off communication sessions of subscriber terminals from one of said plurality of airborne base stations to at least one other of said plurality of airborne base stations.

51. A method according to claim 50 wherein the step of positioning the platform comprises positioning the platform at a location to minimize interference with transient airplanes.

52. A method according to claim 50 wherein the step of positioning the platform further comprises positioning the platform at an altitude of about 15 to about 20 miles above sea level.

53. A method according to claim 50 wherein the step of positioning the platform comprises positioning the platform at an altitude of approximately 15 miles above sea level.

54. A method for wireless communications in a geographic area comprising:
positioning a switching center at a location to facilitate communication in the geographic area, said switching center switching calls between ones of a plurality of airborne base stations and a telephone network;
positioning and maintaining a plurality of airborne platforms above the geographic area;
supporting said plurality of airborne base stations having at least one antenna on said respective plurality of airborne platforms for directly transmitting/receiving communication signals with a plurality of individual mobile subscriber terminals on the ground in said geographic area and with said switching center, to enable communication sessions to be maintained, through the telephone network, between individual subscriber terminals and other telecommunication terminals; and
handing off communication sessions of subscriber terminals from one of said plurality of airborne base stations to at least one other of said plurality of airborne base stations.

55. A method according to claim 54 wherein the step of positioning the platform comprises positioning the platform at a location to minimize interference with transient airplanes.

56. A method according to claim 54 wherein the step of positioning the platform further comprises positioning the platform at an altitude of about 15 to about 20 miles above sea level.

57. A method according to claim 54 wherein the step of positioning the platform comprises positioning the platform at an altitude of approximately 15 miles above sea level.

58. A cellular-type wireless communications system comprising:
a wireless switching center connected to a telephone network;
a plurality of airborne base stations each associated with a cell corresponding to a specific geographic area, each airborne base station operable to directly transmit and receive communication signals to/from individual subscriber terminals within the associated cell and to/from said wireless switching center to enable communication sessions to be maintained, through the telephone network, between individual subscriber terminals and other telecommunication terminals, said plurality of airborne base stations including at least one antenna for communicating with said wireless switching center and with individual subscriber terminals in an associated cell; and
each of said plurality of airborne base stations being supported by at least one airborne platform including a propulsion system, the propulsion system being mounted on the airborne platform and being operable to maintain the platform airborne above a geographic area being serviced by the airborne base station.

59. A wireless communications system according to claim 58 wherein the platform includes a high altitude balloon.

60. A wireless communications system according to claim 58 wherein the propulsion system includes a propeller driven by an electric motor.

61. A wireless communication system according to claim 60 further including an energy storage system and a solar panel, said energy storage system and said solar panel being operable to power said propulsion system.

62. A wireless communications system according to claim 61 wherein said solar panel is operable to recharge said energy storage system.

63. A wireless communications system according to claim 61 wherein said energy storage system is operable to power said propulsion system during nighttime operation and said solar panel is operable to power said propulsion system during daytime operation.

64. A wireless communications system according to claim 58 wherein said propulsion system maintains said platform at an altitude of about 15 to about 20 miles above sea level.

65. A wireless communications system according to claim 64 wherein the platform is maintained at an altitude of about 15 miles above sea level.

66. A wireless communications system according to claim 58 wherein said at least one antenna comprises a high gain, narrow beam antenna array.

67. A wireless communications system according to claim 58 wherein the platform includes an aircraft.

68. A wireless communication system according to claim 58, wherein the at least one airborne base station includes first and second airborne base stations, said first airborne base station communicating with said second airborne base station via a microwave link.

69. A method for wireless communications in a geographic area comprising:
positioning a mobile switching center at a location to facilitate communication in the geographic area, said mobile switching center switching calls between ones of a plurality of airborne base stations and a telephone network;
positioning and maintaining a plurality of airborne platforms above the geographic area; and
supporting said plurality of airborne base stations having at least one antenna on said respective plurality of airborne platforms for directly transmitting/receiving communication signals with a plurality of individual mobile subscriber terminals on the ground in said geographic area and with said mobile switching center, to enable communication sessions to be maintained, through the telephone network, between individual subscriber terminals and other telecommunication terminals.

70. A method according to claim 69 wherein the step of positioning the platform comprises positioning the platform at a location to minimize interference with transient airplanes.

71. A method according to claim 69 wherein the step of positioning the platform further comprises positioning the platform at an altitude of about 15 to about 20 miles above sea level.

72. A method according to claim 69 wherein the step of positioning the platform comprises positioning the platform at an altitude of approximately 15 miles above sea level.

73. A method for wireless communications in a geographic area comprising:
positioning a switching center at a location to facilitate communication in the geographic area, said switching center switching calls between ones of a plurality of airborne base stations and a telephone network;
positioning and maintaining a plurality of airborne platforms above the geographic area; and
supporting said plurality of airborne base stations having at least one antenna on said respective plurality of airborne platforms for directly transmitting/receiving communication signals with a plurality of individual mobile subscriber terminals on the ground in said geographic area and with said switching center, to enable communication sessions to be maintained, through the telephone network, between individual subscriber terminals and other telecommunication terminals.

74. A method according to claim 73 wherein the step of positioning the platform comprises positioning the platform at a location to minimize interference with transient airplanes.

75. A method according to claim 73 wherein the step of positioning the platform further comprises positioning the platform at an altitude of about 15 to about 20 miles above sea level.

76. A method according to claim 73 wherein the step of positioning the platform comprises positioning the platform at an altitude of approximately 15 miles above sea level.

77. A cellular-type wireless communications system comprising:
a wireless switching center connected to a telephone network;
a plurality of airborne base stations each associated with a cell corresponding to a specific geographic area, each of said plurality of airborne base stations operable to directly transmit and receive communication signals to/from individual subscriber terminals within the associated cell and to/from said wireless switching center to enable communication sessions to be maintained, through the telephone network, between individual subscriber terminals and other telecommunication terminals; and at least one of said plurality of airborne base stations having at least one antenna for communicating with said wireless switching center and with individual subscriber terminals in a specific geographic region, said plurality of airborne base stations comprising at least a first airborne base station supported by a first aircraft above the geographic region and a second airborne base station supported by a second aircraft.

78. The wireless communications system of claim 77, wherein said first airborne base station is operative to hand off communication sessions with subscriber terminals to the second airborne base station, said wireless switching center coordinating handoffs between the first and second airborne base stations.

79. The wireless communications system of claim 77, wherein each said aircraft flies in a pattern.

80. A cellular-type wireless communications system comprising:
   a wireless switching center connected to a telephone network;
   a plurality of airborne stations each associated with a cell corresponding to a specific geographic area, each airborne station operable to directly transmit and receive communication signals to/from individual subscriber terminals within the associated cell and to/from said wireless switching center to enable communication sessions to be maintained, through the telephone network, between individual subscriber terminals and other telecommunication terminals, said plurality of airborne stations including at least one antenna for communicating with said wireless switching center and with individual subscriber terminals in an associated cell; and
   each of said plurality of airborne stations being supported by at least one airborne platform including a propulsion system, the propulsion system being mounted on the airborne platform and being operable to maintain the platform airborne above a geographic area being serviced by the airborne station; and
   each of said plurality of airborne stations being operative, in conjunction with the wireless switching center, to hand off communication sessions with subscriber terminals to at least one other airborne station.

81. A wireless communications system according to claim 80 wherein the platform includes a high altitude balloon.

82. A wireless communications system according to claim 80 wherein the propulsion system includes a propeller driven by an electric motor.

83. A wireless communication system according to claim 82 further including an energy storage system and a solar panel, said energy storage system and said solar panel being operable to power said propulsion system.

84. A wireless communications system according to claim 83 wherein said solar panel is operable to recharge said energy storage system.

85. A wireless communications system according to claim 83 wherein said energy storage system is operable to power said propulsion system during nighttime operation and said solar panel is operable to power said propulsion system during daytime operation.

86. A wireless communications system according to claim 80 wherein said propulsion system maintains said platform at an altitude of about 15 to about 20 miles above sea level.

87. A wireless communications system according to claim 86 wherein the platform is maintained at an altitude of about 15 miles above sea level.

88. A wireless communications system according to claim 80 wherein said at least one antenna comprises a high gain, narrow beam antenna array.

89. A wireless communications system according to claim 80 wherein the platform includes an aircraft.

90. A wireless communication system according to claim 80, wherein the at least one airborne station includes first and second airborne stations, said first airborne station communicating with said second airborne station via a microwave link.

91. A method for wireless communications in a geographic area comprising:
   positioning a mobile switching center at a location to facilitate communication in the geographic area, said mobile switching center switching calls between ones of a plurality of airborne stations and a telephone network;
   positioning and maintaining a plurality of airborne platforms above the geographic area;
   supporting said plurality of airborne stations having at least one antenna on said respective plurality of airborne platforms for directly transmitting/receiving communication signals with a plurality of individual mobile subscriber terminals on the ground in said geographic area and with said mobile switching center, to enable communication sessions to be maintained, through the telephone network, between individual subscriber terminals and other telecommunication terminals; and
   handing off communication sessions of subscriber terminals from one of said plurality of airborne stations to at least one other of said plurality of airborne stations.

92. A method according to claim 91 wherein the step of positioning the platform comprises positioning the platform at a location to minimize interference with transient airplanes.

93. A method according to claim 91 wherein the step of positioning the platform further comprises positioning the platform at an altitude of about 15 to about 20 miles above sea level.

94. A method according to claim 91 wherein the step of positioning the platform comprises positioning the platform at an altitude of approximately 15 miles above sea level.

95. A method for wireless communications in a geographic area comprising:
   positioning a switching center at a location to facilitate communication in the geographic area, said switching center switching calls between ones of a plurality of airborne stations and a telephone network;
   positioning and maintaining a plurality of airborne platforms above the geographic area;
   supporting said plurality of airborne stations having at least one antenna on said respective plurality of airborne platforms for directly transmitting/receiving communication signals with a plurality of individual mobile subscriber terminals on the ground in said geographic area and with said switching center, to enable communication sessions to be maintained, through the telephone network, between individual subscriber terminals and other telecommunication terminals; and
   handing off communication sessions of subscriber terminals from one of said plurality of airborne stations to at least one other of said plurality of airborne stations.

96. A method according to claim 95 wherein the step of positioning the platform comprises positioning the platform at a location to minimize interference with transient airplanes.

97. A method according to claim 95 wherein the step of positioning the platform further comprises positioning the platform at an altitude of about 15 to about 20 miles above sea level.

98. A method according to claim 95 wherein the step of positioning the platform comprises positioning the platform at an altitude of approximately 15 miles above sea level.

99. A cellular-type wireless communications system comprising:
a wireless switching center connected to a telephone network;
a plurality of airborne stations each associated with a cell corresponding to a specific geographic area, each airborne station operable to directly transmit and receive communication signals to/from individual subscriber terminals within the associated cell and to/from said wireless switching center to enable communication sessions to be maintained, through the telephone network, between individual subscriber terminals and other telecommunication terminals, said plurality of airborne stations including at least one antenna for communicating with said wireless switching center and with individual subscriber terminals in an associated cell; and
each of said plurality of airborne stations being supported by at least one airborne platform including a propulsion system, the propulsion system being mounted on the airborne platform and being operable to maintain the platform airborne above a geographic area being serviced by the airborne station.

100. A wireless communications system according to claim 99 wherein the platform includes a high altitude balloon.

101. A wireless communications system according to claim 99 wherein the propulsion system includes a propeller driven by an electric motor.

102. A wireless communication system according to claim 101 further including an energy storage system and a solar panel, said energy storage system and said solar panel being operable to power said propulsion system.

103. A wireless communications system according to claim 102 wherein said solar panel is operable to recharge said energy storage system.

104. A wireless communications system according to claim 102 wherein said energy storage system is operable to power said propulsion system during nighttime operation and said solar panel is operable to power said propulsion system during daytime operation.

105. A wireless communications system according to claim 99 wherein said propulsion system maintains said platform at an altitude of about 15 to about 20 miles above sea level.

106. A wireless communications system according to claim 105 wherein the platform is maintained at an altitude of about 15 miles above sea level.

107. A wireless communications system according to claim 99 wherein said at least one antenna comprises a high gain, narrow beam antenna array.

108. A wireless communications system according to claim 99 wherein the platform includes an aircraft.

109. A wireless communication system according to claim 99, wherein the at least one airborne station includes first and second airborne stations, said first airborne station communicating with said second airborne station via a microwave link.

110. A method for wireless communications in a geographic area comprising:
positioning a mobile switching center at a location to facilitate communication in the geographic area, said mobile switching center switching calls between ones of a plurality of airborne stations and a telephone network;
positioning and maintaining a plurality of airborne platforms above the geographic area; and
supporting said plurality of airborne stations having at least one antenna on said respective plurality of airborne platforms for directly transmitting/receiving communication signals with a plurality of individual mobile subscriber terminals on the ground in said geographic area and with said mobile switching center, to enable communication sessions to be maintained, through the telephone network, between individual subscriber terminals and other telecommunication terminals.

111. A method according to claim 110 wherein the step of positioning the platform comprises positioning the platform at a location to minimize interference with transient airplanes.

112. A method according to claim 110 wherein the step of positioning the platform further comprises positioning the platform at an altitude of about 15 to about 20 miles above sea level.

113. A method according to claim 110 wherein the step of positioning the platform comprises positioning the platform at an altitude of approximately 15 miles above sea level.

114. A method for wireless communications in a geographic area comprising:
positioning a switching center at a location to facilitate communication in the geographic area, said switching center switching calls between ones of a plurality of airborne stations and a telephone network;
positioning and maintaining a plurality of airborne platforms above the geographic area; and
supporting said plurality of airborne stations having at least one antenna on said respective plurality of airborne platforms for directly transmitting/receiving communication signals with a plurality of individual mobile subscriber terminals on the ground in said geographic area and with said switching center, to enable communication sessions to be maintained, through the telephone network, between individual subscriber terminals and other telecommunication terminals.

115. A method according to claim 114 wherein the step of positioning the platform comprises positioning the platform at a location to minimize interference with transient airplanes.

116. A method according to claim 114 wherein the step of positioning the platform further comprises positioning the platform at an altitude of about 15 to about 20 miles above sea level.

117. A method according to claim 114 wherein the step of positioning the platform comprises positioning the platform at an altitude of approximately 15 miles above sea level.

118. A cellular-type wireless communications system comprising:
a wireless switching center connected to a telephone network;
a plurality of airborne stations each associated with a cell corresponding to a specific geographic area, each of said plurality of airborne stations operable to directly transmit and receive communication signals to/from individual subscriber terminals within the associated cell and to/from said wireless switching center to enable communication sessions to be maintained, through the telephone network, between individual subscriber terminals and other telecommunication terminals; and
at least one of said plurality of airborne stations having at least one antenna for communicating with said wireless switching center and with individual subscriber terminals in a specific geographic region, said plurality of airborne stations comprising at least a first airborne station supported by a first aircraft above the geographic region and a second airborne station supported by a second aircraft.

119. The wireless communications system of claim 118, wherein said first airborne station is operative to hand off communication sessions with subscriber terminals to the second airborne station, said wireless switching center coordinating handoffs between the first and second airborne stations.

120. The wireless communications system of claim 118, wherein each said aircraft flies in a pattern.

121. A system as defined in claim 1, further comprising means for detecting drift of said nodes in the sub-orbital plane.

122. A system as defined in claim 5, further comprising means for detecting drift of said nodes in the sub-orbital plane.

123. A method as defined in claim 20, further comprising the step of detecting drift of said nodes in the sub-orbital plane.

124. A method as defined in claim 23, further comprising the step of detecting drift of said nodes in the sub-orbital plane.

125. A wireless communications system according to claim 39, further comprising means for detecting drift of said plurality of airborne base stations away from the geographic area being serviced by said airborne base stations.

126. A system as defined in claim 1 wherein each of said nodes is maintained stationary over its own point on the earth using a guidance module which is connected by a guidance antenna to a ground link antennae.

127. A method as defined in claim 20 wherein each of said nodes is maintained stationary over its own point on the earth using a guidance module which is connected by a guidance antenna to a ground link antennae.

128. A wireless, telecommunications network system comprising:
a plurality of telecommunications nodes located in a sub-orbital plane at about 12 to 35 miles above the earth,
means for maintaining said nodes stationary in the sub-orbital plane over preselected points on the earth; and
each of said nodes comprising means for sending and receiving telecommunications signals over a wireless telecommunications channel between said stationary node in the sub-orbital plane and a mobile ground communications device.

129. A system as defined in claim 128 wherein the means for sending and receiving said radio telecommunications signals further including a plurality of antennae that are operative to receive relatively weak telecommunications signals from said mobile ground communications device.

130. A system as defined in claim 129 further comprising means on said plurality of telecommunications nodes for decoding the telecommunications signals received by each of said antennae so that each node can identify said mobile ground communications device and its location, wherein said antennae and said decoding means being operative to increase the sensitivity of each node to signals identifying said mobile ground communications device and its location so that it can detect and receive relatively weak telecommunications signals, so that maximum utilization of a spectrum is made available for use by said telecommunications signals without interference.

131. A system as defined in claim 128 wherein the means for sending and receiving telecommunications signals on the telecommunications node is configured to receive telephone communication signals from a ground station or cellular telephone and then transmit it to another ground station or cellular telephone through another telecommunications node.

* * * * *

UNITED STATES PATENT AND TRADEMARK OFFICE
CERTIFICATE OF CORRECTION

| | | |
|---|---|---|
| PATENT NO. | : 8,483,120 B2 | Page 1 of 1 |
| APPLICATION NO. | : 10/307116 | |
| DATED | : July 9, 2013 | |
| INVENTOR(S) | : Seligsohn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1497 days.

Signed and Sealed this
Twenty-fourth Day of February, 2015

Michelle K. Lee
*Deputy Director of the United States Patent and Trademark Office*